United States Patent [19]

Wicén et al.

[11] Patent Number: 4,776,309
[45] Date of Patent: Oct. 11, 1988

[54] INTERNAL COMBUSTION ENGINE HAVING LOW OCTANE NUMBER REQUIREMENTS

[75] Inventors: Jan Wicén, Saltsjöbaden; Lennart Forslund, Upsala; Raoul Niklasson, Spånga, all of Sweden

[73] Assignee: Oktan AB, Stockholm, Sweden

[21] Appl. No.: 926,633

[22] Filed: Nov. 3, 1986

[30] Foreign Application Priority Data

Nov. 8, 1985 [SE] Sweden ............................. 8505302

[51] Int. Cl.$^4$ ............................................ F02B 77/02
[52] U.S. Cl. ................................. 123/193 P; 123/669
[58] Field of Search ............... 123/193 R, 193 P, 668, 123/669

[56] References Cited

U.S. PATENT DOCUMENTS

| | | | |
|---|---|---|---|
| 3,459,167 | 8/1969 | Briggs et al. | 123/669 |
| 3,911,891 | 10/1975 | Dowell | 123/669 |
| 4,254,621 | 3/1981 | Nagumo | 123/669 |
| 4,538,562 | 9/1985 | Matsui et al. | 123/669 |

OTHER PUBLICATIONS

Comptes Rendues Acad. Sc. Paris, t. 261, 18 Oct. 1965, Group 6, pp. 3080, 3081.

Primary Examiner—Craig R. Feinberg
Assistant Examiner—David A. Okonsky
Attorney, Agent, or Firm—Frishauf, Holtz, Goodman & Woodward

[57] ABSTRACT

In a spark-ignition internal combustion engine of the type having a combustion chamber which presents at least one surface area on which there is applied at least one layer which presents to the combustion chamber a layer defining surface having very low reflectivity to electromagnetic waves in the wavelength range of about 0.2–7.0 microns. The layer reflects non-absorbed incident waves in a diffuse fashion, thereby to reduce the octane number requirement of the engine. The total surface area thus treated for each combustion chamber of the engine is equal to at least 10% of the top surface area of the piston in said chamber. The overall efficiency of the engine can be further improved when at least one of the layers has an underlying defining surface distal from the combustion chamber which reflects substantially all incoming electromagnetic waves in the wavelength range above 2.5 microns in a diffuse fashion.

6 Claims, 1 Drawing Sheet

INTERNAL COMBUSTION ENGINE HAVING LOW OCTANE NUMBER REQUIREMENTS

TECHNICAL FIELD

The present invention relates to a spark-ignition internal combustion engine of the kind having a combustion chamber which, at least in part, presents surface areas that are treated to reduce the octane number requirement of the engine, said surfaces preferably covering a total combustion chamber area equal to at least 10% of the top face of the piston.

BACKGROUND PRIOR ART

An internal combustion engine of this kind is known, for example, from U.S. Pat. No. 4,508,070. According to this Patent Specification, the surfaces of the combustion chamber are given a fine surface structure in the form of recesses comprising a multiplicity of grooves or pits, each having a width of up to about 3 microns and a depth of up to about 1 micron. Surfaces treated in this way are said to improve the octane number requirement of an engine by about 5, i.e. an engine requiring e.g., a 98 octane fuel can be driven on a 93 octane fuel. Tests have shown, however, that for reasons not yet fully understood this improvement is not always achieved.

As is well known, subsequent to ignition the flame-front propagates in the combustion chamber at the same time as the un-combusted fuel/air mixture is compressed and heated. If the temperature and the pressure of the non-combusted gas mixture reaches critical values before the characteristic flame-front has passed through the whole of the gas mixture, the non-combusted gas mixture will combust spontaneously and result in combustion knock. Apparently the surface structure is able to influence energy conditions in the combustion chamber in some instances, so as to prevent combustion knock.

It is also possible to increase engine efficiency, and therewith reduce fuel consumption, and to reduce heat losses in a similar manner, as recognised in U.S. Pat. No. 3,459,167. This specification teaches internal combustion engines in which combustion chamber surfaces have been coated with a material which is highly reflective to infrared radiation and which also forms a thermal barrier, so as to keep the walls of the combustion chamber at a relatively low temperature. The coating may have the form of a layer of cuprous oxide, and is applied by first cleaning the surface or surfaces to be treated and then blasting said surface (surfaces) to create irregularities therein. The cuprous oxide layer is then applied, e.g., by flame spraying copper particles to a thickness of at least 0.15 mm. In this way there is provided a coating which is at least 75% reflective to thermal radiation within a wave length of 0.7–10 microns at prevailing combustion chamber temperatures.

SUMMARY OF THE INVENTION

The object of the present invention is to provide an internal combustion engine of the aforesaid kind in which the treated surfaces of the combustion chamber are effective in influencing the combustion process in a manner to reduce the octane number requirement of the engine without resulting in unreasonable thermal losses.

To this end there is provided in accordance with the invention a spark-ignition internal combustion engine of the kind in which the engine combustion chamber presents, at least in part, surface areas which have been treated in a manner to reduce the octane number requirement of the engine, and in which the treated surfaces with regard to each combustion chamber present a total area which is equal to at least 10% of the piston head area. The engine is characterized in that each treated surface area presents to the combustion chamber at least one layer having extremely low reflective properties to electromagnetic waves in the wave length band of about 0.2–7.0 microns, and which also reflects incident non-absorbed waves in a diffuse manner.

Further characteristic features of the invention are set forth in the depending claims.

The invention is based on the concept of selectively preventing electomagnetic radiation having a wave length of up to about 7 microns and originating from the process of combustion from being reflected to any appreciable extent from the defining surfaces of the combustion chamber, back into the combustion space and heating and igniting the residual gas mixture before said mixture is combusted. This can be achieved by treating the surface areas in a manner which renders said surfaces highly absorptive to wave lengths lying in the aforesaid range and for diffuse reflection of the non-absorbed incident waves. Thus, the nature of these surfaces is the opposite to that of the surfaces according to the last mentioned U.S. patent specification, according to which the surfaces desccribed therein are intended to absorb as little radiation as possible, in order to prevent the surfaces from being heated to high temperatures, resulting in heat losses and therewith poor efficiency and possible ignition of the non-combusted gas mixture before the flame front reaches said mixture. However, this reflected radiation, which is rich in energy tends to enhance combustion knock, and therefore has a pronounced negative effect on any improvement in efficiency that might otherwise be achieved.

In accordance with one embodiment of the invention, the treatment of said surfaces involves the application of one or more layers on the top of the aforementioned low reflective layer, wherewith an underlying defining surface may be given properties such as to reflect radiation within said wavelength range in a diffuse manner. One of said layers may comprise, for example, a cermet material, i.e. a combination of metal particles and an oxide.

In accordance with a preferred embodiment of the invention the treated surfaces are made highly reflective to wave lengths in the wave length range above about 7 microns. The purpose hereby is to reduce, to the greatest possible extent, the generation of heat as a result of subjecting the surfaces of the combustion chamber to prolonged thermal radiation, by reflecting the thermal radiation containing the least energy back to the interior of the combustion chamber, where it is unable to cause ignition, and to maintain total efficiency at the highest possible level.

BRIEF DESCRIPTION OF THE DRAWINGS

The invention will now be described in more detail with reference to the accompanying drawings, in which.

DESCRIPTION OF PREFERRED EMBODIMENTS

Figure 1:
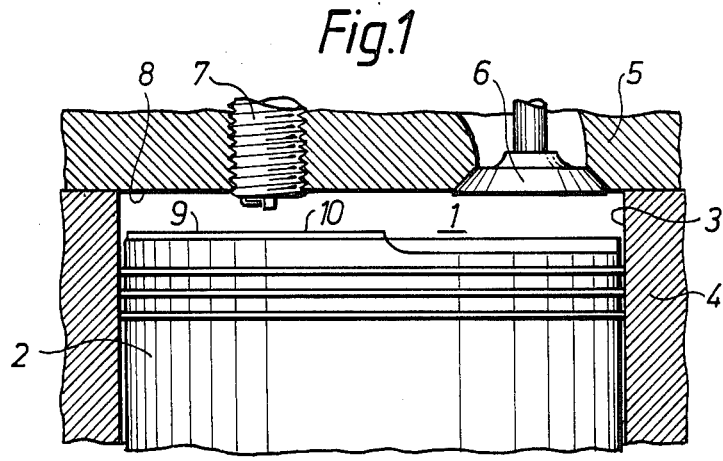
FIG. 1 is a part sectional view of a combustion chamber of an internal combustion engine.

FIG. 1 illustrates a combustion chamber 1 above a piston 2 located in a cylinder 3 of an internal combustion engine 4. The combustion chamber is defined upwardly by a cylinder block 5, which incorporates valves, such as valve 6, and a spark plug 7.

The walls of the combustion chamber are formed essentially by the top face of the piston and the undersurface 8 of the cylinder block 5 facing said chamber 1, and only to a minor part by the wall of cylinder 3 located above the piston 2.

Subsequent to introducing an air/fuel mixture into the combustion chamber and compression of the mixture therein, combustion is initiated with the aid of one or more sparks delivered by the spark plug, during continued compression of the mixture.

Normally, the process of combustion continues until the flame front has propagated through the whole body of the mixture, in the absence of spontaneous combustion of non-combusted mixture residues.

As the mixture is compressed it is heated both as a result of compression and as a result of being irradiated with electromagnetic waves emitted from the flame front, and from the hot gases and any particles of soot present therein, and also from the defining surfaces of the combustion chamber, these waves being characteristically reflected towards the chamber walls, therewith creating a serious risk that the walls will become heated and that ignition of non-combusted gas mixture will take place, resulting in deleterious combustion knock.

Figure 2:
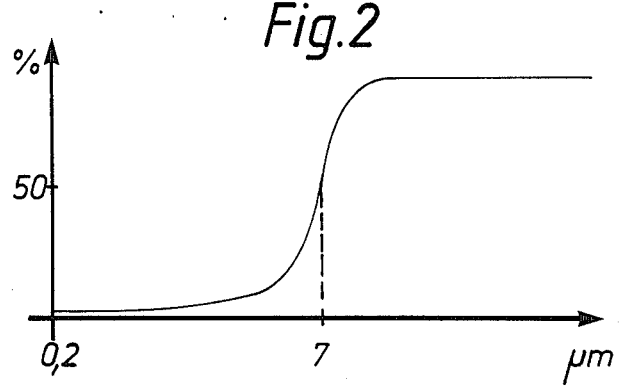
FIG. 2 is a curve illustrating the reflective properties of a treated surface in the internal combustion engine, said properties being given as a function of the wavelength of the incident electromagnetic radiation.

In order to prevent the occurence of such events, a surface, e.g. the part-surface 10, located on the upper face of the piston 2 and having a defining surface 9 which faces the chamber 1 is treated in accordance with the invention in a manner which will result in the absorption of the major part of all energy-rich waves in the wavelength up to about 7 microns, while energy-lean waves having a wavelength above 7 microns will mostly be reflected, as illustrated in FIG. 2, and with which incident non-absorbed waves will be reflected in a diffuse fashion, thereby to reduce the risk of heating the chamber walls and igniting the non-combusted mixture.

Figure 3:
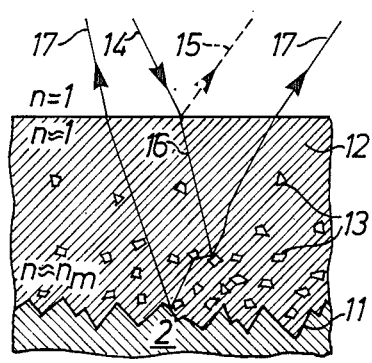
FIGS. 3 and 4 are sectional views of two different surfaces, selected for illustration purposes, comprising respectively one and two layers formed in accordance with the invention.

This treatment can be effected by first blasting or etching the piston surface, to create irregularities 11 therein, such that the surface has a degree of roughness which results in diffuse reflection of incident waves of wavelength above 2.5 microns, and then applying to the thus roughened surface a layer of cermet material comprising a metal oxide 12 and metal particles 13 to a thickness of about 0.25 microns. The amount of metal particles applied increases with increasing layer depths, so that the refractive index n for the electromagnet radiation at a location adjacent the defining surface 9 facing the combustion chamber 1 is close to 1 (one) i.e. the refractive index of air, and at a location adjacent the bottom of the layer is close to the refractive index of metal, $n_m$, as illustrated in FIG. 3. The major part of the thermal radiation, here illustrated in the form of an electromagnetic wave 14, incident on the layer 12, 13, will pass into the oxide layer 12, while a small part 15 of said radiation will be reflected, since the refractive index is close to 1. The penetrating part 16 of this radiation impinges on the metal particles 13, and ultimately on the undulating surface 11, while being repeatedly reflected, wherewith the electromagnetic radiation is progressively converted into heat, whereas that part 17 of the radiation which is not absorbed is reflected in a diffuse fashion back to the combustion chamber. The aforesaid selectivity is achieved through suitable choice of dimensions and materials, as will be readily understandable to those skilled in this art.

Figure 4:
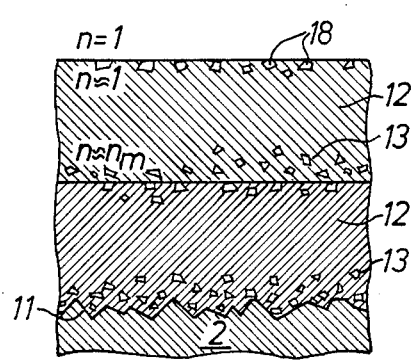

As illustrated in FIG. 4, the upper surface of the piston 2 may be provided with several layers of cermet or other materials 12, 13. In order to enhance the absorption of thermal radiation still further, small air-filled cavities 18 may be provided in the close proximity of the defining surface 9, of at least the upper layer 12, 13, said surface facing towards the combustion chamber 1.

It will be understood that other parts of the combustion chamber defining surfaces can be treated in accordance with the aforegoing, for example, selected surfaces on the cylinder block 5, the valves 6, etc.

What is claimed is:

1. In a spark-ignition internal combustion engine, in which the engine comprises means including a piston for defining a combustion chamber, said piston having a piston head, and said combustion chamber defining means having surfaces areas which are treated in a manner to reduce the octane number requirement of the engine, the treated surface areas of each combustion chamber having a total area which is equal to at least 10% of the piston head area, the improvement wherein;

each treated surface area presents to the combustion chamber at least one layer of predetermined thickness which has a lowest reflectivity over a wavelength band of about 0.2–7 microns and exhibits extremely low reflectivity electromagnetic waves in said entire wavelength band of about 0.2–7 microns; and reflects incident non-absorbed waves in a diffuse manner; said treated surface being made highly reflective to wavelengths starting above 7 microns.

2. The internal combustion engine according to claim 1 in which each said treated surface area includes more than one layer wherein at least one of the layers has an underlying defining surface which faces away from the combustion chamber and which reflects substantially all incident electromagnetic waves in said wavelength range above 2.5 microns in a diffuse fashion.

3. The internal combustion engine according to claim 1 in which each said treated surface area includes more than one layer wherein at least one of the layers incorporates a mixture of ceramic and metallic components.

4. The internal combustion engine according to claim 1, wherein said at least one layer incorporates a mixture of ceramic and metallic components.

5. The internal combustion engine according to claim 1 in which said at least one layer has a predetermined thickness, said thickness of the layer having a refractive index which varies through the thickness of the layer such that a part of the layer which is disposed nearest the combustion chamber has the lowest refractive index.

6. The internal combustion engine according to claim 1 in which said at least one layer has a predetermined thickness, said thickness of the layer having a refractive index which varies throughout the thickness of the layer, wherein that part of the layer located nearest the combustion chamber has a refractive index close to 1, or approximately equal to that of air, and that part of the layer located furthest from the chamber has a high refractive index, approximately equal to that of metal.

* * * * *